United States Patent
Lee et al.

(10) Patent No.: US 8,494,511 B2
(45) Date of Patent: Jul. 23, 2013

(54) METHOD FOR CONTROLLING A MOBILE TERMINAL BASED ON STATUS RESPONSE INFORMATION RECEIVED FROM AN EXTERNAL TERMINAL

(75) Inventors: Jin Hee Lee, Seoul (KR); Se Yong Jung, Seoul (KR); Yoo Jin Kang, Seoul (KR); Min Hun Kang, Seoul (KR); Yun Jin Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 373 days.

(21) Appl. No.: 12/828,188

(22) Filed: Jun. 30, 2010

(65) Prior Publication Data

US 2011/0039534 A1 Feb. 17, 2011

(30) Foreign Application Priority Data

Aug. 11, 2009 (KR) .................. 10-2009-0073619

(51) Int. Cl.
*H04M 3/00* (2006.01)
*H04M 1/00* (2006.01)
*H04B 7/00* (2006.01)
*H04W 4/00* (2009.01)

(52) U.S. Cl.
USPC .......... 455/420; 455/41.2; 455/418; 455/466; 455/502; 455/566

(58) Field of Classification Search
USPC ............... 455/41.2–41.3, 418–421, 434, 466, 455/515, 517, 550.1, 552.1, 556.1–556.2, 455/557–558, 561, 566–567, 569.1, 68–69, 455/414.1, 414.3, 500, 502; 370/310, 312–313, 370/324, 350, 395.62, 507–514, 520; 380/274; 348/194, 425.4, 500; 375/145–147, 149, 375/240.28, 357, 363–366; 705/319
See application file for complete search history.

(56) References Cited

U.S. PATENT DOCUMENTS

| | | | | |
|---|---|---|---|---|
| 7,369,862 B2* | 5/2008 | Kim et al. | ................. | 455/456.3 |
| 7,640,012 B2* | 12/2009 | Chae | .............................. | 455/418 |
| 2005/0052404 A1* | 3/2005 | Kim et al. | ..................... | 345/108 |
| 2005/0107078 A1* | 5/2005 | Imura | ........................... | 455/421 |
| 2006/0026269 A1* | 2/2006 | Sadovsky et al. | ............ | 709/222 |
| 2006/0194596 A1* | 8/2006 | Deng | ........................... | 455/466 |
| 2006/0234684 A1* | 10/2006 | Shin | ......................... | 455/414.1 |
| 2007/0082702 A1* | 4/2007 | Maaniitty | ..................... | 455/557 |
| 2007/0298777 A1* | 12/2007 | Kim et al. | ..................... | 455/420 |
| 2008/0045207 A1* | 2/2008 | Ahn et al. | ..................... | 455/428 |
| 2008/0101561 A1* | 5/2008 | Choi et al. | ................... | 379/88.17 |
| 2008/0261622 A1* | 10/2008 | Lee et al. | .................. | 455/456.2 |
| 2009/0042608 A1* | 2/2009 | Moon et al. | ................. | 455/556.1 |
| 2009/0091550 A1* | 4/2009 | Lim et al. | ...................... | 345/173 |
| 2009/0298469 A1* | 12/2009 | Kim et al. | ..................... | 455/411 |
| 2009/0303066 A1* | 12/2009 | Lee et al. | ...................... | 340/679 |
| 2009/0323684 A1* | 12/2009 | Chu et al. | ..................... | 370/389 |
| 2010/0125801 A1* | 5/2010 | Shin | .............................. | 715/758 |

* cited by examiner

*Primary Examiner* — Meless Zewdu
(74) *Attorney, Agent, or Firm* — Lee, Hong, Degerman, Kang & Waimey

(57) ABSTRACT

A method for controlling a mobile terminal and a mobile terminal thereof, the method: synchronizing with an external terminal by using a wireless communication module of the mobile terminal; receiving a control command signal in response to a status of the external terminal through the wireless communication module; and executing at least one of changing a receiving mode of the mobile terminal and setting up an alarm function based on the control command signal.

14 Claims, 11 Drawing Sheets

METHOD FOR CONTROLLING A MOBILE TERMINAL BASED ON STATUS RESPONSE INFORMATION RECEIVED FROM AN EXTERNAL TERMINAL

Pursuant to 35 U.S.C. §119 (a), this application claims the benefit of earlier filing date and right of priority to Korean Patent Application No. 10-2009-0073619, filed on Aug. 11, 2009, the contents of which are hereby incorporated by reference in their entirety.

BACKGROUND OF THE DISCLOSURE

1. Field

The present disclosure relates to a method for controlling a mobile terminal controllable in response to status information of an external terminal while being synchronized with the external terminal and a mobile terminal thereof.

2. Background

Generally, terminals can be classified into mobile/portable terminals and stationary terminals. The mobile terminals can be further classified into handheld terminals and vehicle mount terminals according to possibility of user's direct portability.

As functions of the terminal are diversified, the terminal is implemented as a multimedia player provided with composite functions such as photographing of photos or moving pictures, playback of music or moving picture files, game play, broadcast reception and the like, for example.

To implement the complex functions in the multimedia player, improvement of structural parts and/or software parts of the terminal may be considered in various attempts.

Concomitant with development of Internet, moving pictures can be viewed via a mobile terminal. IPTV (Internet Protocol Television) may be an example of the Internet moving pictures.

Furthermore, efforts have been made to improve a messenger function as SNS (Social Network Service) and the messenger function become popular.

SUMMARY

Objects of the present disclosure are to promote a user convenience by changing a set-up of a mobile terminal in response to status of an external terminal.

In one general aspect of the present disclosure, a method for controlling a mobile terminal, the method comprising: synchronizing with an external terminal by using a wireless communication module of the mobile terminal; receiving a control command signal in response to a status of the external terminal through the wireless communication module; and executing at least one of changing a receiving mode of the mobile terminal and setting up an alarm function based on the control command signal.

In some exemplary embodiment of the present disclosure, the step of synchronizing with an external terminal by using a wireless communication module of the mobile terminal may comprise receiving a synchronization request signal from the external terminal as a messenger program is driven.

In some exemplary embodiment of the present disclosure, the step of synchronizing with an external terminal by using a wireless communication module of the mobile terminal may comprise receiving a control command signal in response to messenger status information through the wireless communication module from the external terminal.

In some exemplary embodiment of the present disclosure, the step of executing at least one of changing a receiving mode of the mobile terminal and setting up an alarm function based on the control command signal may comprise: displaying a receiving mode changing menu on a display of the mobile terminal; and determining a receiving mode to be changed by a user selection signal while the receiving mode changing menu is being displayed, wherein the receiving mode changing menu may include at least any one of a menu mode, an automatic response mode, and a personal computer (PC) mode.

In some exemplary embodiment of the present disclosure, the step of receiving a control command signal in response to messenger status information through the wireless communication module may comprise receiving the control command signal transmitted from the external terminal as a result of the fact that a multimedia file is reproduced by the external terminal.

In some exemplary embodiment of the present disclosure, the step of receiving a control command signal in response to messenger status information through the wireless communication module may comprise receiving a control command signal based on time information and contents information stored in a predetermined program through the wireless communication module in a case a predetermined program is driven by the external terminal.

In another general aspect of the present disclosure, a method for controlling a mobile terminal, the method comprising: synchronizing with a messenger of an external terminal by using a wireless communication module of the mobile terminal; and driving a messenger program pre-stored in a memory of the mobile terminal and displaying the messenger program in a display in a case the mobile terminal is distanced from the external terminal at a predetermined space or more.

The method may further comprise a step of automatically logging in the messenger program through an ID (Identification) and a password pre-stored in a memory of the mobile terminal.

In still another general aspect of the present disclosure, a mobile terminal comprising: a wireless communication module configured to synchronize with an external terminal; and a controller configured to execute at least one of changing a receiving mode of the mobile terminal and setting up an alarm function based on a control command signal, if the control command signal is received through the wireless communication module.

In some exemplary embodiment of the present disclosure, the mobile terminal may further comprise a memory configured to store a messenger program of the mobile terminal, wherein the controller controllably drives the messenger program pre-stored in the memory in a case the external terminal is distanced at a predetermined space or more.

In some exemplary embodiment of the present disclosure, the mobile terminal, the controller may control the change of receiving mode in a case the control command signal based on the messenger status information of the external terminal is received through the wireless communication module.

In some exemplary embodiment of the present disclosure, the mobile terminal may further comprise a display for displaying the receiving mode change menu displayed in response to the control command signal.

In some exemplary embodiment of the present disclosure, the receiving mode change menu may comprise at least any one of a menu mode, an automatic response mode, and a personal computer (PC) mode.

In some exemplary embodiment of the present disclosure, the controller may control the change of receiving mode as a result of the fact that the reproduction control command is received based on the multimedia file reproduction of the external terminal.

In some exemplary embodiment of the present disclosure, the controller may receive a control command signal based on time information and contents information stored in a predetermined program through the wireless communication module in a case a predetermined program is driven by the external terminal.

In some exemplary embodiment of the present disclosure, the mobile terminal may further comprise a display, wherein the controller controllably drives a messenger program pre-stored in the memory of the mobile terminal to display the messenger program on the display in a case the external terminal is distanced at a predetermined space or more.

In some exemplary embodiment of the present disclosure, the controller may determine that the mobile terminal has distanced from the external terminal at a predetermined space if it is determined that a signal intensity received from the wireless communication module is less than a predetermined value.

In some exemplary embodiment of the present disclosure, the mobile terminal may further comprise a position information module for checking a position of the mobile terminal, wherein the controller may determine whether the mobile terminal has distanced from the external terminal at a predetermined space based on position information from the position information module.

In some exemplary embodiment of the present disclosure, the mobile terminal may further comprise a memory configured to store an ID (Identification) and password information, wherein the controller automatically logs in the executed messenger program through the ID (Identification) and the password pre-stored in a memory of the mobile terminal in a case the mobile terminal has distanced from the external terminal at a predetermined space.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably.

Embodiments of the present disclosure may be applicable to various types of terminals. Examples of such terminals may include mobile terminals as well as stationary terminals, such as mobile phones, user equipment, smart phones, DTV, computers, digital broadcast terminals, personal digital assistants, portable multimedia players (PMP) and/or navigators.

A further description may be provided with regard to a mobile terminal, although such teachings may apply equally to other types of terminals.

Figure 1:
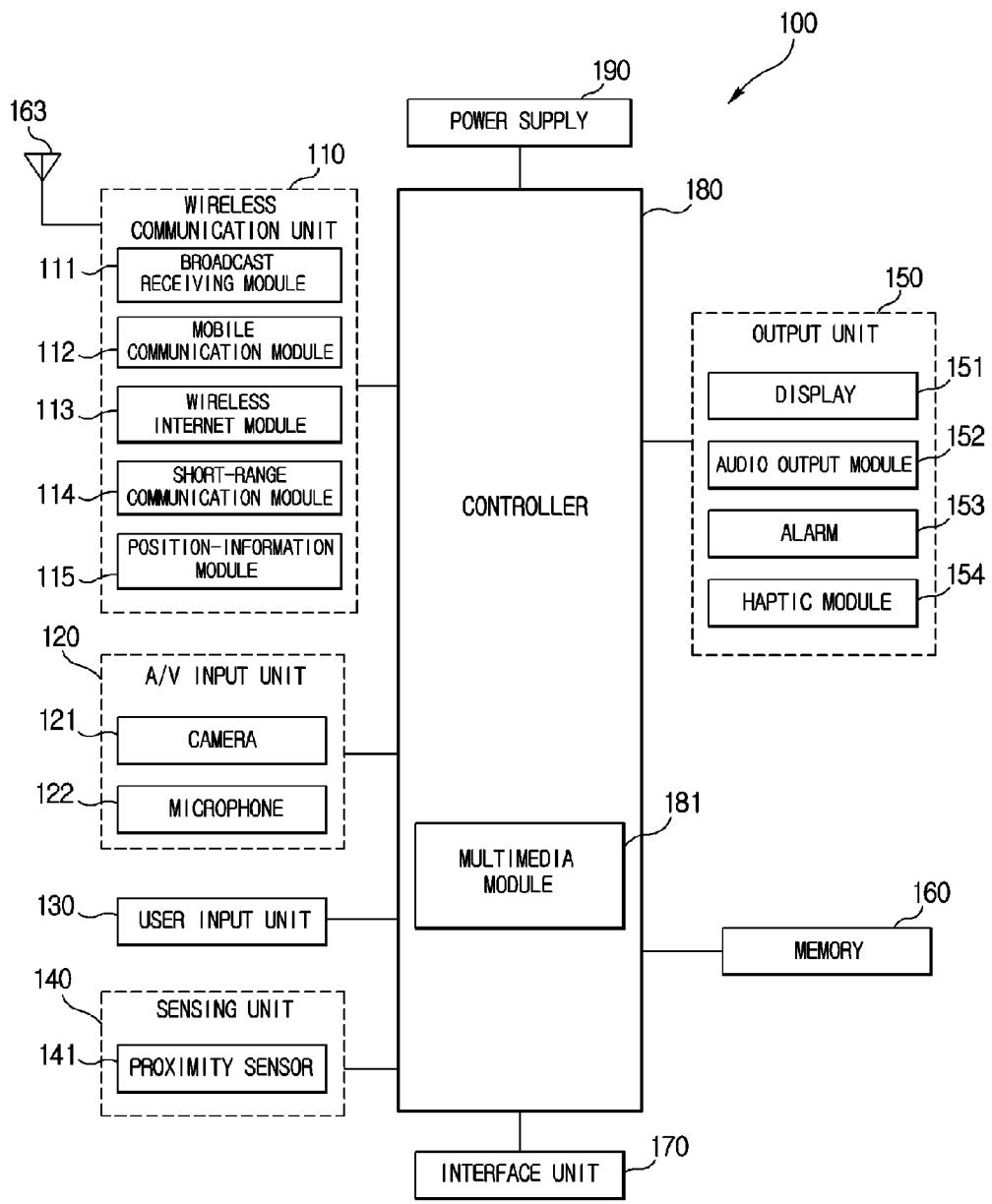
FIG. 1 is a block diagram of a mobile terminal according to an exemplary embodiment of the present disclosure.

FIG. 1 is a block diagram of a mobile terminal in accordance with an example embodiment. Other embodiments and arrangements may also be provided. FIG. 1 shows a mobile terminal 100 having various components, although other components may also be used. More or less components may alternatively be implemented.

FIG. 1 shows that the mobile terminal 100 includes a wireless communication unit 110, an audio/video (A/V) input unit 120, a user input unit 130, a sensing unit 140, an output unit 150, a memory 160, an interface unit 170, a controller 180 and a power supply 190.

The wireless communication unit 110 may be configured with several components and/or modules. The wireless communication unit 110 may include a broadcast receiving module 111, a mobile communication module 112, a wireless Internet module 113, a short-range communication module 114 and a position-location module 115. The wireless communication unit 110 may include one or more components that permit wireless communication between the mobile terminal 100 and a wireless communication system or a network within which the mobile terminal 100 is located. In case of non-mobile terminals, the wireless communication unit 110 may be replaced with a wire communication unit. The wireless communication unit 110 and the wire communication unit may be commonly referred to as a communication unit.

The broadcast receiving module 111 may receive a broadcast signal and/or broadcast associated information from an external broadcast managing entity via a broadcast channel. The broadcast channel may include a satellite channel and a terrestrial channel. The broadcast managing entity may refer to a system that transmits a broadcast signal and/or broadcast associated information.

At least two broadcast receiving modules 111 may be provided in the mobile terminal 100 to pursue simultaneous reception of at least two broadcast channels or facilitation of broadcast channel switching.

Examples of broadcast associated information may include information associated with a broadcast channel, a broadcast program, a broadcast service provider, etc. For example, broadcast associated information may include an electronic program guide (EPG) of digital multimedia broadcasting (DMB) and an electronic service guide (ESG) of digital video broadcast-handheld (DVB-H).

The broadcast signal may be a TV broadcast signal, a radio broadcast signal, and/or a data broadcast signal. The broadcast signal may further include a broadcast signal combined with a TV or radio broadcast signal.

The broadcast receiving module 111 may receive broadcast signals transmitted from various types of broadcast systems. As a non-limiting example, the broadcasting systems may include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The receiving of multicast signals may also be provided. Data received by the broadcast receiving module 111 may be stored in the memory 160, for example.

The mobile communication module 112 may communicate wireless signals with one or more network entities (e.g. a base station or Node-B). The signals may represent audio, video, multimedia, control signaling, and data, etc.

The wireless Internet module 113 may support Internet access for the mobile terminal 100. This wireless Internet module 113 may be internally or externally coupled to the mobile terminal 100. Suitable technologies for wireless Internet may include, but are not limited to, WLAN (Wireless LAN)(Wi-Fi), Wibro (Wireless broadband), Wimax (World Interoperability for Microwave Access), and/or HSDPA (High Speed Downlink Packet Access). The wireless Internet module 113 may be replaced with a wire Internet module in non-mobile terminals. The wireless Internet module 113 and the wire Internet module may be referred to as an Internet module.

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as Bluetooth and ZigBee.

The position-location module 115 may identify or otherwise obtain a location of the mobile terminal 100. The position-location module 115 may be provided using global positioning system (GPS) components that cooperate with associated satellites, network components, and/or combinations thereof.

The position-location module 115 may precisely calculate current 3-dimensional position information based on longitude, latitude and altitude by calculating distance information and precise time information from at least three satellites and then by applying triangulation to the calculated information. Location and time information may be calculated using three satellites, and errors of the calculated location position and time information may then be amended or changed using another satellite. The position-location module 115 may calculate speed information by continuously calculating a real-time current location.

The audio/video (A/V) input unit 120 may provide audio or video signal input to the mobile terminal 100. The A/V input unit 120 may include a camera 121 and a microphone 122. The camera 121 may receive and process image frames of still pictures and/or video.

The microphone 122 may receive an external audio signal while the mobile terminal is in a particular mode, such as a phone call mode, a recording mode and/or a voice recognition mode. The received audio signal may then be processed and converted into digital data.

The mobile terminal 100, and in particular the A/V input unit 120, may include a noise removing algorithm (or noise canceling algorithm) to remove noise generated in the course of receiving the external audio signal. Data generated by the A/V input unit 120 may be stored in the memory 160, utilized by the output unit 150, and/or transmitted via one or more modules of the wireless communication unit 110. Two or more microphones and/or cameras may also be provided.

The user input unit 130 may generate input data responsive to user manipulation of an associated input device or devices. Examples of such devices may include a keypad, a dome switch, a touchpad (e.g., static pressure/capacitance), a jog wheel and/or a jog switch. A specific example is one in which the user input unit 130 is configured as a touchpad in cooperation with a display, as will be described below.

The sensing unit 140 may provide status measurements of various aspects of the mobile terminal 100. For example, the sensing unit 140 may detect an open/close status (or state) of the mobile terminal 100, a relative positioning of components (e.g., a display and a keypad) of the mobile terminal 100, a change of position of the mobile terminal 100 or a component of the mobile terminal 100, a presence or absence of user contact with the mobile terminal 100, and/or an orientation or acceleration/deceleration of the mobile terminal 100.

The mobile terminal 100 may be configured as a slide-type mobile terminal. In such a configuration, the sensing unit 140 may sense whether a sliding portion of the mobile terminal 100 is open or closed. The sensing unit 140 may also sense presence or absence of power provided by the power supply 190, presence or absence of a coupling or other connection between the interface unit 170 and an external device, etc.

The sensing unit 140 may include a proximity sensor 141.

The output unit 150 may generate an output relevant to a sight sense, an auditory sense, a tactile sense and/or the like. The output unit 150 may include a display 151, an audio output module 152, an alarm 153, a haptic module 154 and/or the like.

The display 151 may display (output) information processed by the terminal 100. For example, in case that the terminal is in a call mode, the display 151 may display a user interface (UI) or a graphic user interface (GUI) associated with the call. If the mobile terminal 100 is in a video communication mode or a photograph mode, the display 151 may display a photographed and/or received picture, a UI or a GUI.

The display 151 may include at least one of a liquid crystal display (LCD), a thin film transistor liquid crystal display (TFT LCD), an organic light-emitting diode (OLED), a flexible display, and a 3-dimensional display.

The display 151 may have a transparent or light-transmissive type configuration to enable an external environment to be seen through. This may be called a transparent display. A transparent OLED (TOLED) may be an example of a transparent display. A backside structure of the display 151 may also have the light-transmissive type configuration. In this configuration, a user may see an object located behind the terminal body through the area occupied by the display 151 of the terminal body.

At least two displays 151 may also be provided. For example, a plurality of displays may be provided on a single face of the terminal 100 by being built in one body or spaced apart from the single face. Alternatively, each of a plurality of displays may be provided on different faces of the terminal 100.

If the display 151 and a sensor for detecting a touch action (hereinafter a touch sensor) are constructed in a mutual-layered structure (hereinafter a touch screen), the display 151 may be used as an input device as well as an output device. For example, the touch sensor may include a touch film, a touch sheet, a touchpad and/or the like.

The touch sensor may convert a pressure applied to a specific portion of the display 151 or a variation of electrostatic capacity generated from a specific portion of the display 151 to an electric input signal. The touch sensor may detect a pressure of a touch as well as a position and size of the touch.

If a touch input is provided to the touch sensor, signal(s) corresponding to the touch input may be transferred to a touch controller. The touch controller may process the signal(s) and then transfer corresponding data to the controller 180. The controller 180 may therefore know which portion of the display 151 is touched.

FIG. 1 shows that the proximity sensor 141 can be provided within the mobile terminal 100 enclosed by the touch screen or around the touch screen. The proximity sensor 141 may detect a presence or non-presence of an object approaching a prescribed detecting surface or an object existing around the proximity sensor 141 using an electromagnetic field strength or infrared ray without mechanical contact. The proximity sensor 141 may have a longer durability than the contact type sensor and may also have a greater usage than the contact type sensor.

The proximity sensor 141 may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and/or the like. If the touch screen is an electrostatic type, the proximity sensor 141 may detect proximity of a pointer using a variation of an electric field according to the proximity of the pointer. In this case, the touch screen (touch sensor) may be classified into the proximity sensor.

An action in which a pointer approaches the touch screen without contacting the touch screen may be called a proximity touch. An action in which a pointer actually touches the touch screen may be called a contact touch. The location of the touch screen proximity-touched by the pointer may be the position of the pointer that vertically opposes the touch screen when the pointer performs the proximity touch.

The proximity sensor 141 may detect a proximity touch and/or a proximity touch pattern (e.g., a proximity touch distance, a proximity touch duration, a proximity touch position, a proximity touch shift state, etc.). Information corresponding to the detected proximity touch action and/or the detected proximity touch pattern may be outputted to the touch screen.

The audio output module 152 may output audio data that is received from the wireless communication unit 110 in a call signal reception mode, a call mode, a recording mode, a voice recognition mode, a broadcast receiving mode and/or the like. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include a receiver, a speaker, a buzzer and/or the like.

The alarm 153 may output a signal for announcing an event occurrence of the mobile terminal 100. An event occurring in the mobile terminal 100 may include one of a call signal reception, a message reception, a key signal input, a touch input and/or the like. The alarm 153 may output a signal for announcing an event occurrence by way of vibration or the like as well as a video signal or an audio signal. The video signal may be outputted via the display 151. The audio signal may be outputted via the audio output module 152. The display 151 or the audio output module 152 may be classified as part of the alarm 153.

The haptic module 154 may bring about various haptic effects that can be sensed by a user. Vibration is a representative example for the haptic effect brought about by the haptic module 154. Strength and pattern of the vibration generated from the haptic module 154 may be controllable. For example, vibrations differing from each other may be outputted in a manner of being synthesized together or may be sequentially outputted.

The haptic module 154 may generate various haptic effects including a vibration, an effect caused by such a stimulus as a pin array vertically moving against a contact skin surface, a jet power of air via outlet, a suction power of air via inlet, a skim on a skin surface, a contact of an electrode, an electrostatic power and the like, and/or an effect by hot/cold sense reproduction using an endothermic or exothermic device as well as the vibration.

The haptic module 154 may provide the haptic effect via direct contact. The haptic module 154 may enable a user to experience the haptic effect via muscular sense of a finger, an arm and/or the like. Two or more haptic modules 154 may be provided according to a configuration of the mobile terminal 100.

The memory 160 may store a program for operations of the controller 180. The memory 160 may temporarily store input/output data (e.g., phonebook, message, still picture, moving picture, etc.). The memory 160 may store data of vibration and sound in various patterns outputted in case of a touch input to the touch screen.

The memory 160 may include at least one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory, a programmable read-only memory, a magnetic memory, a magnetic disk, an optical disk, and/or the like. The mobile terminal 100 may operate in association with a web storage that performs a storage function of the memory 160 in the Internet.

The interface unit 170 may play a role as a passage to external devices connected to the mobile terminal 100. The interface unit 170 may receive data from an external device. The interface unit 170 may be supplied with a power and then the power may be delivered to elements within the mobile terminal 100. The interface unit 170 may enable data to be transferred to an external device from an inside of the mobile terminal 100. The interface unit 170 may include a wire/wireless headset port, an external charger port, a wire/wireless data port, a memory card port, a port for coupling to a device having an identity module, an audio input/output (I/O) port, a video input/output (I/O) port, an earphone port and/or the like.

The identity module may be a chip or card that stores various kinds of information for authenticating use of the mobile terminal 100. The identify module may include a user identity module (UIM), a subscriber identity module (SIM), a universal subscriber identity module (USIM) and/or the like. A device provided with the above identity module (hereafter an identity device) may be manufactured in the form of a smart card. The identity device may be connected to the mobile terminal 100 via the port.

The interface unit 170 may play a role as a passage for supplying a power to the mobile terminal 100 from a cradle that is connected to the mobile terminal 100. The interface unit 170 may play a role as a passage for delivering various command signals, which are inputted from the cradle by a user, to the mobile terminal 100. Various command signals inputted from the cradle or the power may work as a signal for recognizing that the mobile terminal 100 is correctly loaded in the cradle.

The controller 180 may control overall operations of the mobile terminal 100. For example, the controller 180 may perform control and processing relevant to a voice call, a data communication, a video conference and/or the like. The controller 180 may have a multimedia module 181 for multimedia playback. The multimedia module 181 may be implemented within the controller 180 or may be configured separate from the controller 180.

The controller 180 may perform pattern recognizing processing for recognizing a handwriting input performed on the touch screen as a character an/or recognizing a picture drawing input performed on the touch screen as an image.

The power supply 190 may receive an external or internal power and then supply the power required for operations of the respective elements under control of the controller 180.

Embodiments of the present disclosure explained in the following description may be implemented within a recording medium that can be read by a computer or a computer-like device using software, hardware or combination thereof.

According to the hardware implementation, arrangements and embodiments may be implemented using at least one of application specific integrated circuits (ASICs), digital signal processors (DSPs), digital signal processing devices DSPDs), programmable logic devices (PLDs), field programmable gate arrays (FPGAs), processors, controllers, microcontrollers, microprocessors and electrical units for performing other functions. In some cases, embodiments may be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

Figure 2A:
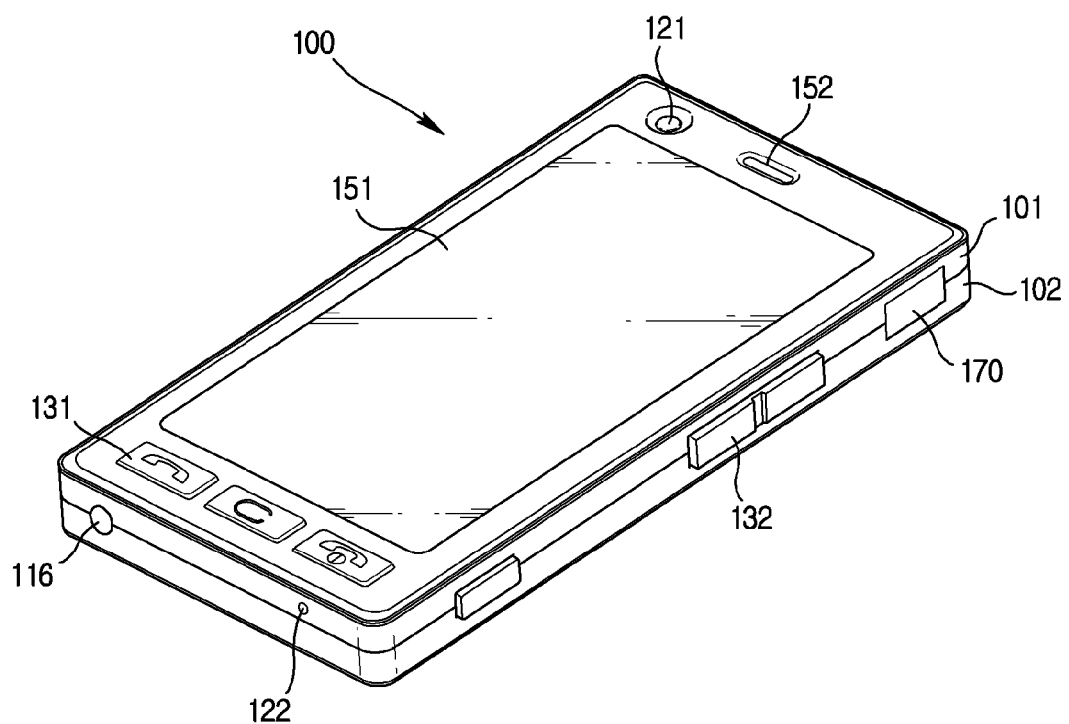
FIG. 2*a* is a front perspective view of a mobile terminal according to an exemplary embodiment of the present disclosure.

FIG. 2a is a front-view of a mobile terminal according to an example embodiment. Other embodiments, configurations and arrangements may also be provided.

As shown in FIG. 2a, the mobile terminal 100 may include a bar type terminal body. Embodiments of the mobile terminal may be implemented in a variety of different configurations. Examples of such configurations may include a folder-type, a slide-type, a bar-type, a rotational-type, a swing-type and/or combinations thereof.

The body may include a case (casing, housing, cover, etc.) that forms an exterior of the terminal. The case may be divided into a front case 101 and a rear case 102. Various electric/electronic parts may be provided in a space between the front case 101 and the rear case 102. A middle case may be further provided between the front case 101 and the rear case 102.

The cases may be formed by injection molding of synthetic resin or may be formed of metal substance such as stainless steel (STS), titanium (Ti) or the like, for example.

The display 151, the audio output unit 152, the camera 121, user input units 130/131/132, the microphone 122, the interface unit 170 and the like may be provided on the terminal body, and more particularly on the front case 101.

The display 151 may occupy most of a main face of the front case 101. The audio output module 152 and the camera 121 may be provided at an area adjacent to one end portion of the display 151, while the user input unit 131 and the microphone 122 may be provided at another area adjacent to the other end portion of the display 151. The user input unit 132 and the interface unit 170 may be provided on lateral sides of the front and rear cases 101 and 102.

The user input unit 130 may receive a command for controlling an operation of the mobile terminal 100. The user input unit 130 may include a plurality of manipulating units 131 and 132. The manipulating units 131 and 132 may be called a manipulating portion and may adopt any mechanism of a tactile manner that enables a user to perform a manipulation action by experiencing a tactile feeling.

Content inputted by the first manipulating unit 131 or the second manipulating unit 132 may be diversely set. For example, a command such as start, end, scroll and/or the like may be inputted to the first manipulating unit 131. A command for a volume adjustment of sound outputted from the audio output unit 152, a command for a switching to a touch recognizing mode of the display 151 or the like may be inputted to the second manipulating unit 132.

Figure 2B:
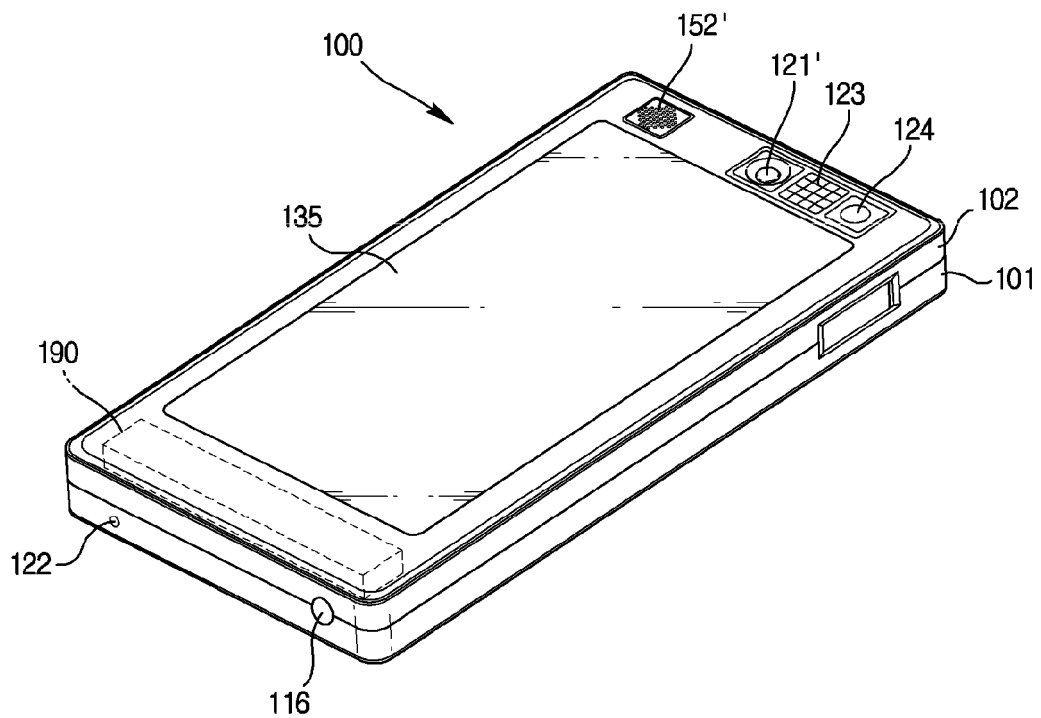
FIG. 2*b* is a backside perspective view of a mobile terminal according to an exemplary embodiment of the present disclosure.

FIG. 2b is a perspective diagram of a backside of the mobile terminal shown in FIG. 2a. Other embodiments, configurations and arrangements may also be provided.

As shown in FIG. 2b, a camera 121' may be additionally provided on a backside of the terminal body, and more particularly on the rear case 102. The camera 121' may have a photographing direction that is substantially opposite to a photographing direction of the camera 121 (shown in FIG. 2a) and may have pixels differing from pixels of the camera 121.

For example, the camera 121 may have a lower number of pixels to capture and transmit a picture of user's face for a video call, while the camera 121' may have a greater number of pixels for capturing a general subject for photography without transmitting the captured subject. Each of the cameras 121 and 121' may be installed on the terminal body to be rotated and/or popped up.

A flash 123 and a mirror 124 may be additionally provided adjacent to the camera 121'. The flash 123 may project light toward a subject in case of photographing the subject using the camera 121'. If a user attempts to take a picture of the user (self-photography) using the camera 121', the mirror 124 may enable the user to view a user's face reflected by the mirror 124.

An additional audio output unit 152' may be provided on the backside of the terminal body. The additional audio output unit 152' may implement a stereo function together with the audio output unit 152 shown in FIG. 2A and may be used for implementation of a speakerphone mode in talking over the terminal.

A broadcast signal receiving antenna 116 may be additionally provided at the lateral side of the terminal body as well as an antenna for communication or the like. The antenna 116 may be considered a portion of the broadcast receiving module 111 shown in FIG. 1 and may be retractably provided on the terminal body.

The power supply 190 for supplying a power to the mobile terminal 100 may be provided to the terminal body. The power supply 190 may be built within the terminal body. Alternatively, the power supply 190 may be detachably connected to the terminal body.

FIG. 2b also shows a touchpad 135 for detecting a touch that is additionally provided on the rear case 102. The touchpad 135 may be configured in a light transmissive type like the display 151. If the display 151 outputs visual information from both faces, the display 151 may recognize visual information via the touchpad 135 as well. The information outputted from both of the faces may be controlled by the touchpad 135. Alternatively, a display may be further provided to the touchpad 135 so that a touch screen may also be provided to the rear case 102.

The touchpad 135 may be activated by interconnecting with the display 151 of the front case 101. The touchpad 135 may be provided in rear of the display 151 in parallel to one another. The touchpad 135 may have a size equal to or less than a size of the display 151.

In the following description, the method for controlling a mobile terminal according to exemplary embodiments of the present disclosure will be explained, referring to the flowcharts of FIGS. 3 and 4.

Figure 3:
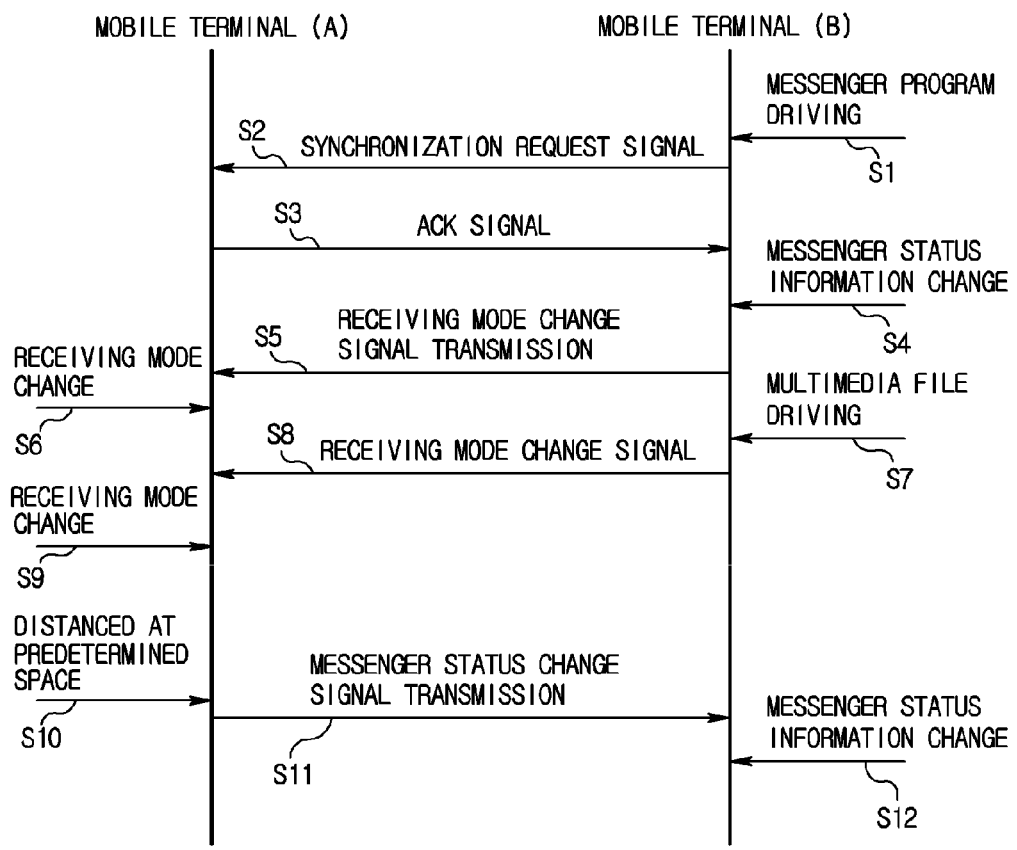
FIG. 3 is a flowchart of a method for controlling a mobile terminal according to a first exemplary embodiment of the present disclosure.
Figure 4:
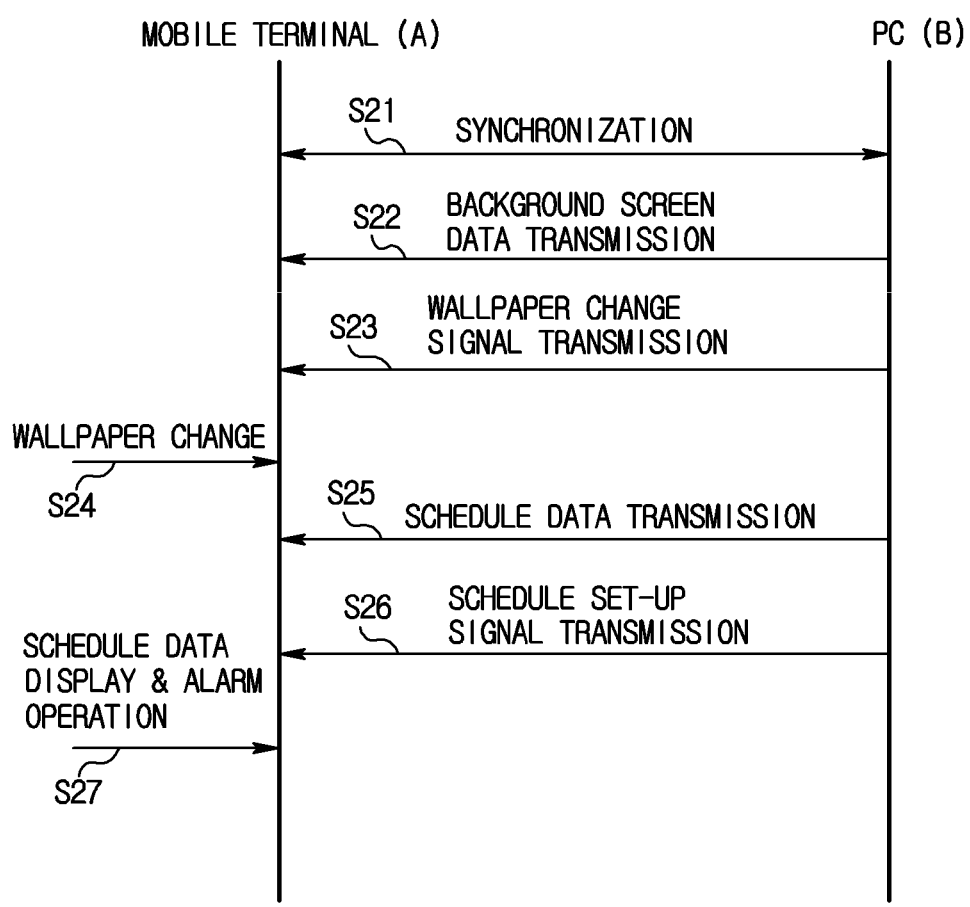
FIG. 4 is a flowchart of a method for controlling a mobile terminal according to a second exemplary embodiment of the present disclosure.

FIG. 3 is a flowchart of a method for controlling a mobile terminal according to a first exemplary embodiment of the present disclosure, and FIG. 4 is a flowchart of a method for controlling a mobile terminal according to a second exemplary embodiment of the present disclosure.

FIRST EXAMPLE

FIG. 3 is a flowchart of a method for controlling a mobile terminal according to a first exemplary embodiment of the present disclosure.

As depicted in the figure, first of all, an external terminal (e.g., PC, personal computer) executes a messenger program stored in a memory (51). The external terminal (B) uses access information of the mobile terminal including the messenger program to send a synchronization request signal to the mobile terminal (A) (S2).

In a case the mobile terminal (A) that has received the synchronization request signal transmits an acknowledgement (ACK) signal in response to the request signal (S3), synchronization is implemented between the mobile terminal (A) and the external terminal (B).

At this time, the synchronization may use, but are not limited to, WLAN (Wireless LAN)(Wi-Fi), Wibro (Wireless broadband), Wimax (World Interoperability for Microwave Access), Bluetooth, Zigbee and ultrared communication.

In the present exemplary embodiment, although the external terminal has sent a synchronization request signal, it is not limited thereto, but the mobile terminal may also transmit the synchronization request signal.

Under this circumstance, in a case messenger status information is changed in the external terminal (S4), the external terminal transmits a receiving mode change signal to the mobile terminal (A) (S5).

As a result, the mobile terminal (A) having received the control command signal (receiving mode change signal) changes the receiving mode to a predetermined mode (S6). Alternatively, in a case a multimedia (a music file, a moving picture and the like) is executed by the external terminal (B), the external terminal (B) transmits the receiving mode change signal to the mobile terminal (A) (S8).

As a result, the mobile terminal (A) having received the control command signal (receiving mode change signal) changes the receiving mode to a predetermined mode (S9). Alternatively, in a case the mobile terminal (A) is distanced from the external terminal (B), that is, in a case a signal intensity goes down below a threshold level (S10), the mobile terminal (A) transmits a messenger status change signal to the external terminal (B) (S11).

In determining if the mobile terminal (A) is distanced from the external terminal (B), the controller 180 may employ a GPS (Global Positioning System) device.

Meanwhile, as a result, the external terminal (B) having received the control command signal (messenger status change signal) changes a messenger status to a 'position vacancy' (S12). That is, in a case the mobile terminal (A) is distanced from the external terminal (B) at a predetermined space, it is determined that a user is in a position on which a PC (external terminal) cannot be used, and as a result, the messenger position is automatically changed to the 'position vacancy'.

According to the first exemplary embodiment, the mobile terminal (A) and the external terminal (B) are synchronized, and the status of the mobile terminal is changed in response to the status of the external terminal to promote the user convenience.

SECOND EXAMPLE

FIG. 4 is a flowchart of a method for controlling a mobile terminal according to a second exemplary embodiment of the present disclosure.

As shown in the figure, the external terminal (B) and the mobile terminal (A) are synchronized (S21). The synchronization will not described again as it has been already explained in FIG. 3.

A background screen image data and a background screen change signal of the external terminal (B) are sent from the external terminal (B) to the mobile terminal (A) (S22, S23). The mobile terminal (A) having received the signal sets up the background screen image data as a wallpaper (S24).

Alternatively, in a case the external terminal (B) is equipped with a schedule data, the schedule data and a schedule set-up signal may be transmitted to the mobile terminal (A) (S25, S26). Under this circumstance, the mobile terminal (A) having received the schedule data and the schedule set-up signal allow a display to display a schedule data on time set up by the schedule data and to execute a predetermined alarm function. (S27)

According to the second exemplary embodiment, the mobile terminal (A) and the external terminal (B) are synchronized, and external terminal information may be automatically transmitted to the mobile terminal. Furthermore, wallpaper change and schedule data set-up can be easily implemented without any separate re-set-up operation.

Hereinafter, the present disclosure will be described in more detail using image views of the mobile terminal applied with the method for controlling the mobile terminal thus described.

Figure 5:
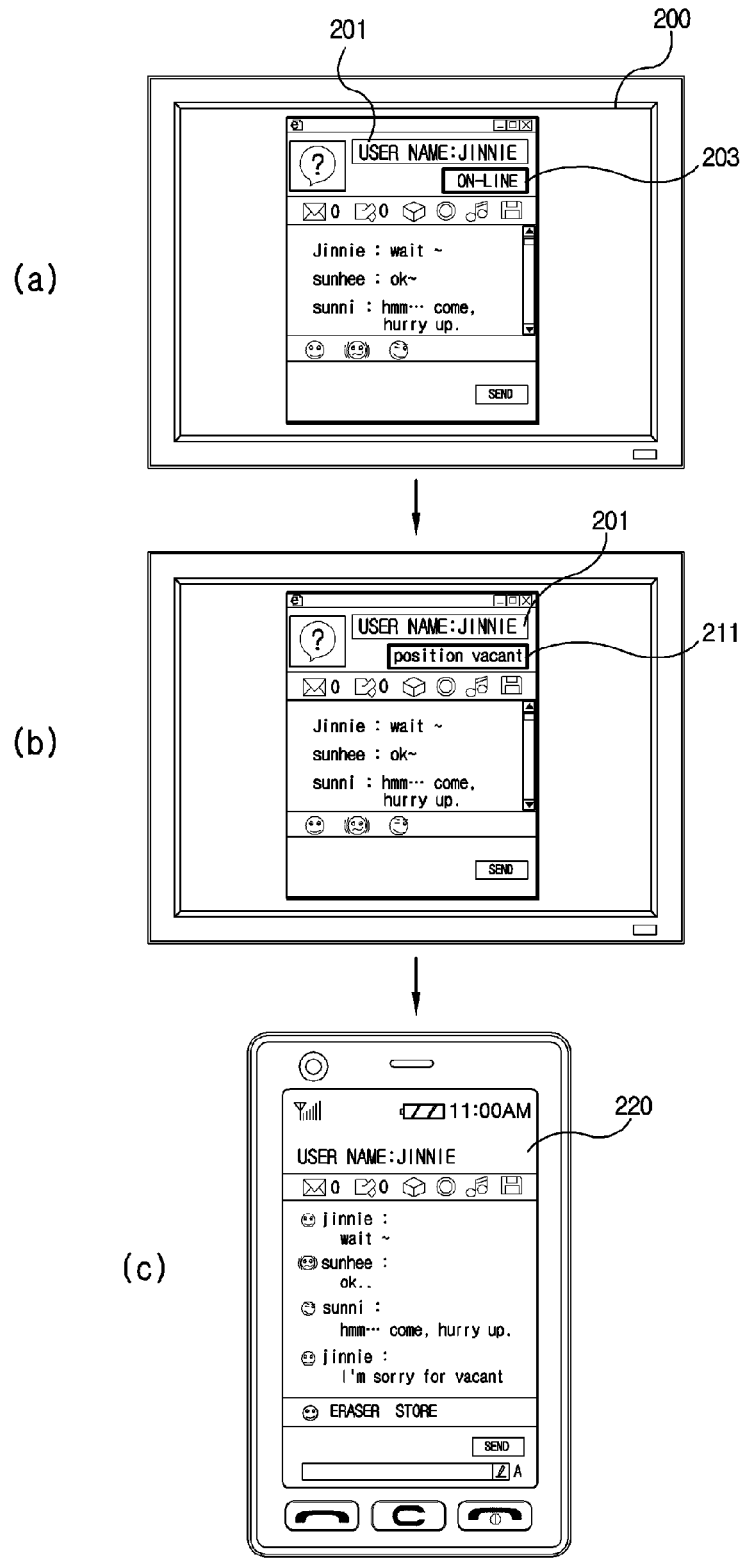
FIG. 5 is an image view of mobile terminal applied with a first example of a method for controlling a mobile terminal according to the present disclosure.
Figure 6:
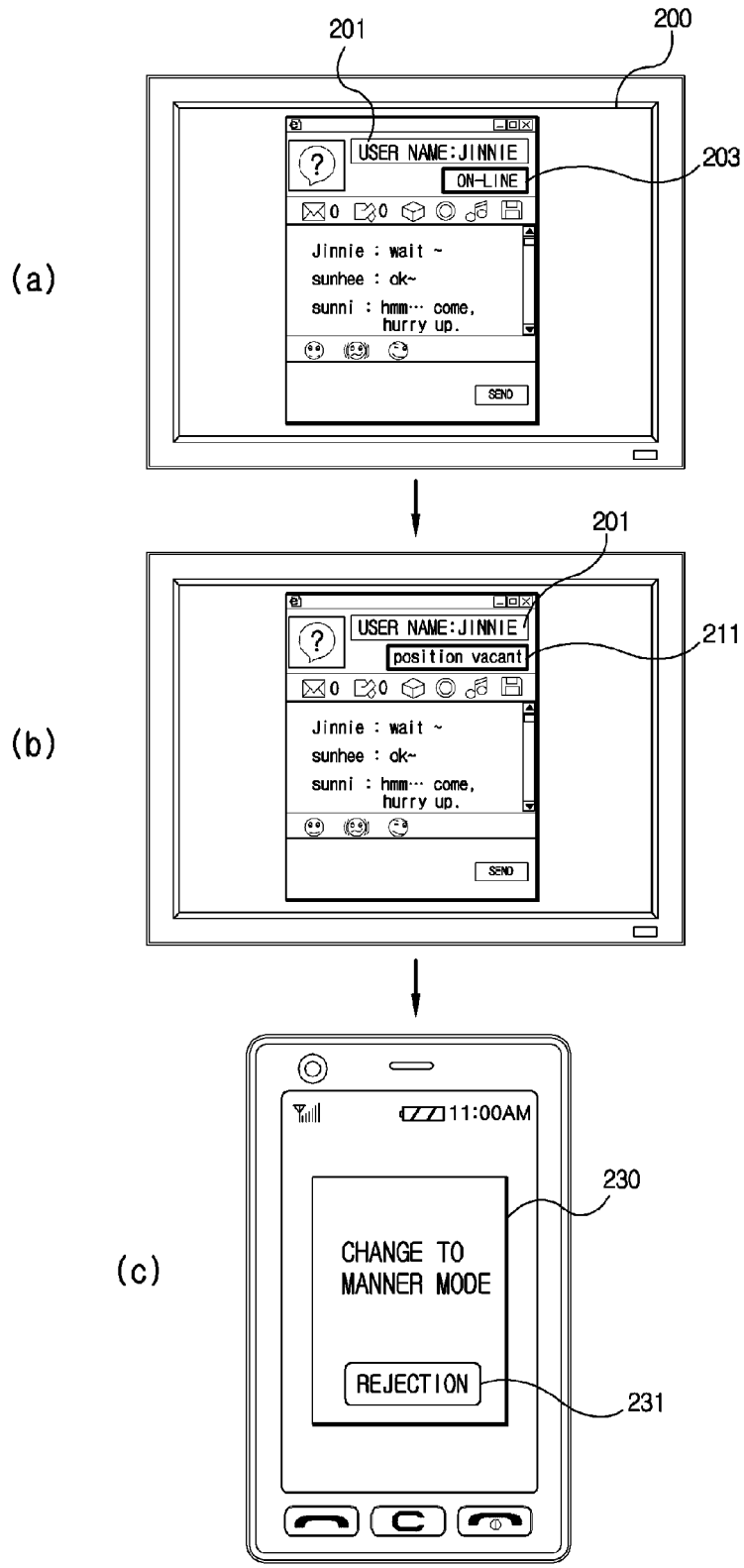
FIG. 6 is an image view of a mobile terminal applied with a second example of a method for controlling a mobile terminal according to the present disclosure.
Figure 7:
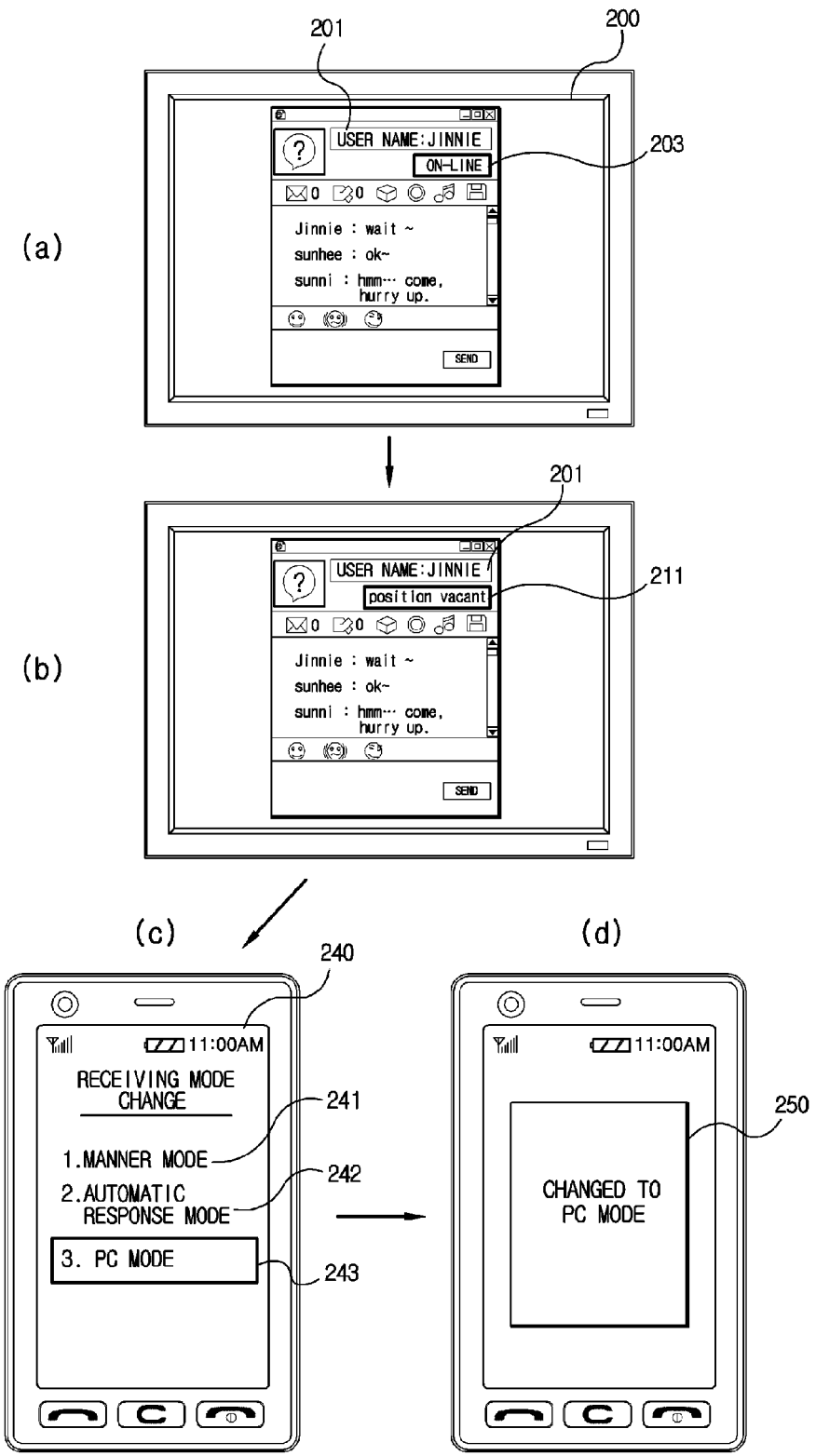
FIG. 7 is an image view of a mobile terminal applied with a third example of a method for controlling a mobile terminal according to the present disclosure.
Figure 8:
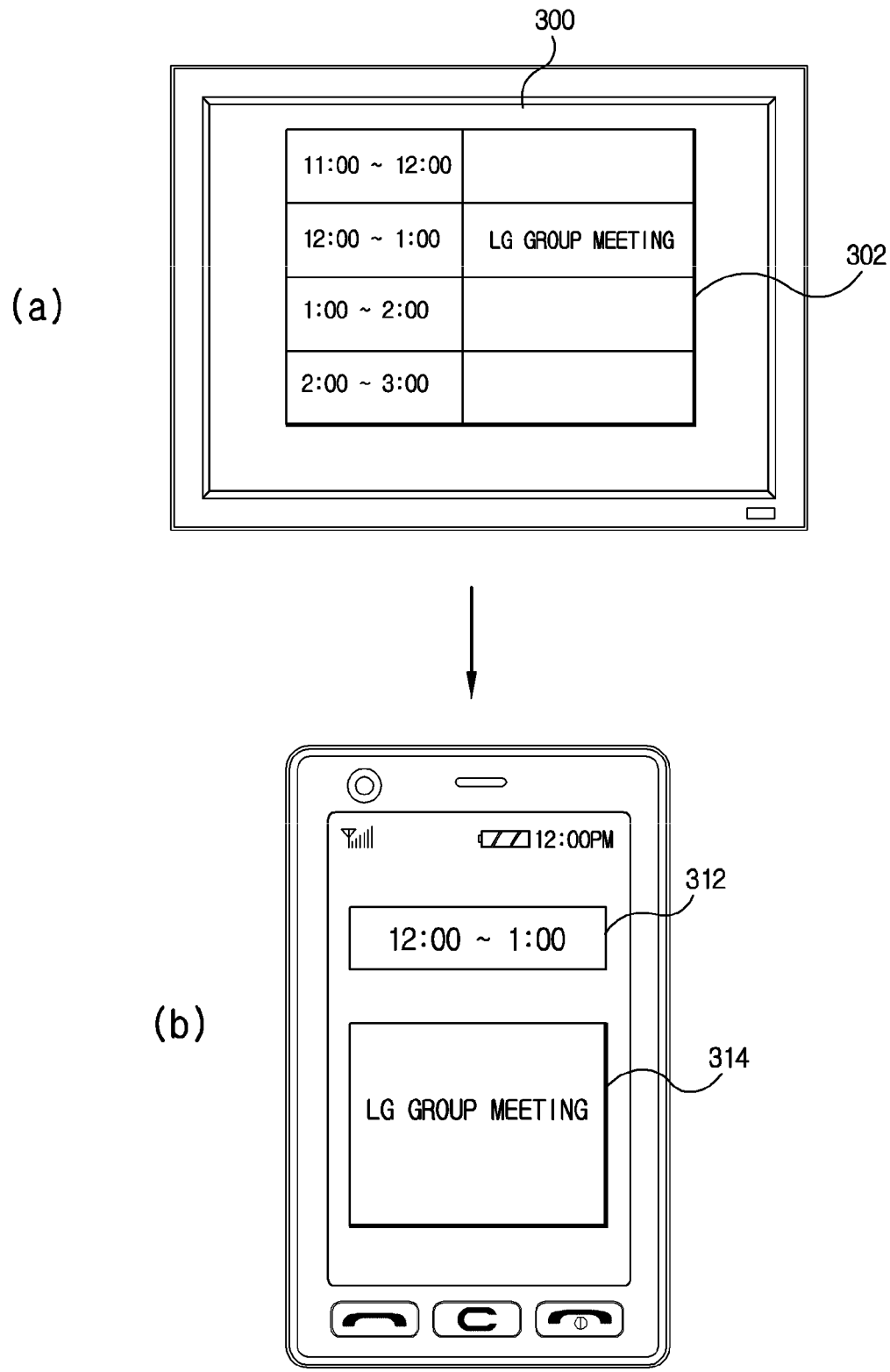
FIG. 8 is an image view of a mobile terminal applied with a fourth example of a method for controlling a mobile terminal according to the present disclosure.
Figure 9:
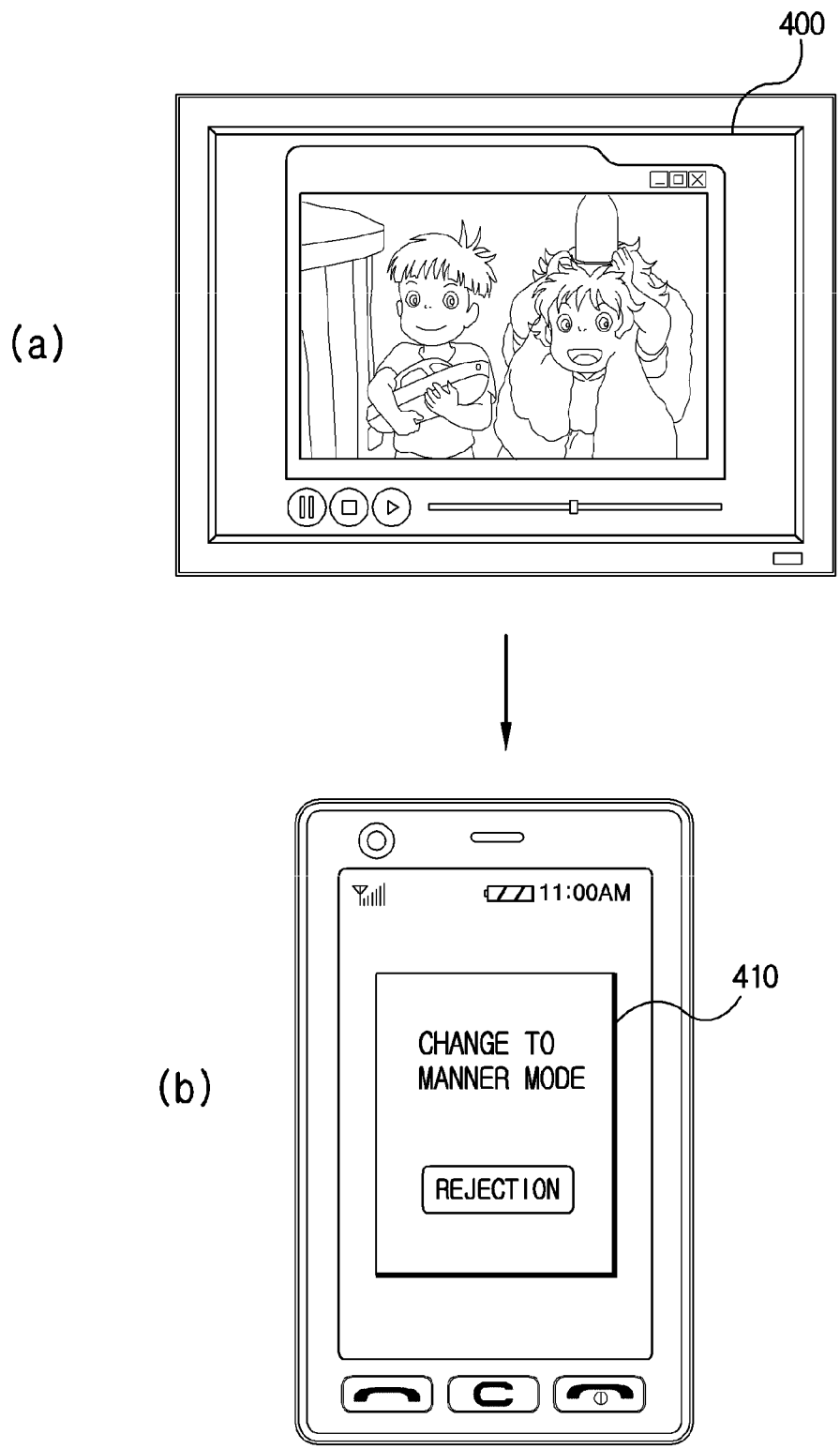
FIG. 9 is an image view of a mobile terminal applied with a fifth example of a method for controlling a mobile terminal according to the present disclosure.
Figure 10:
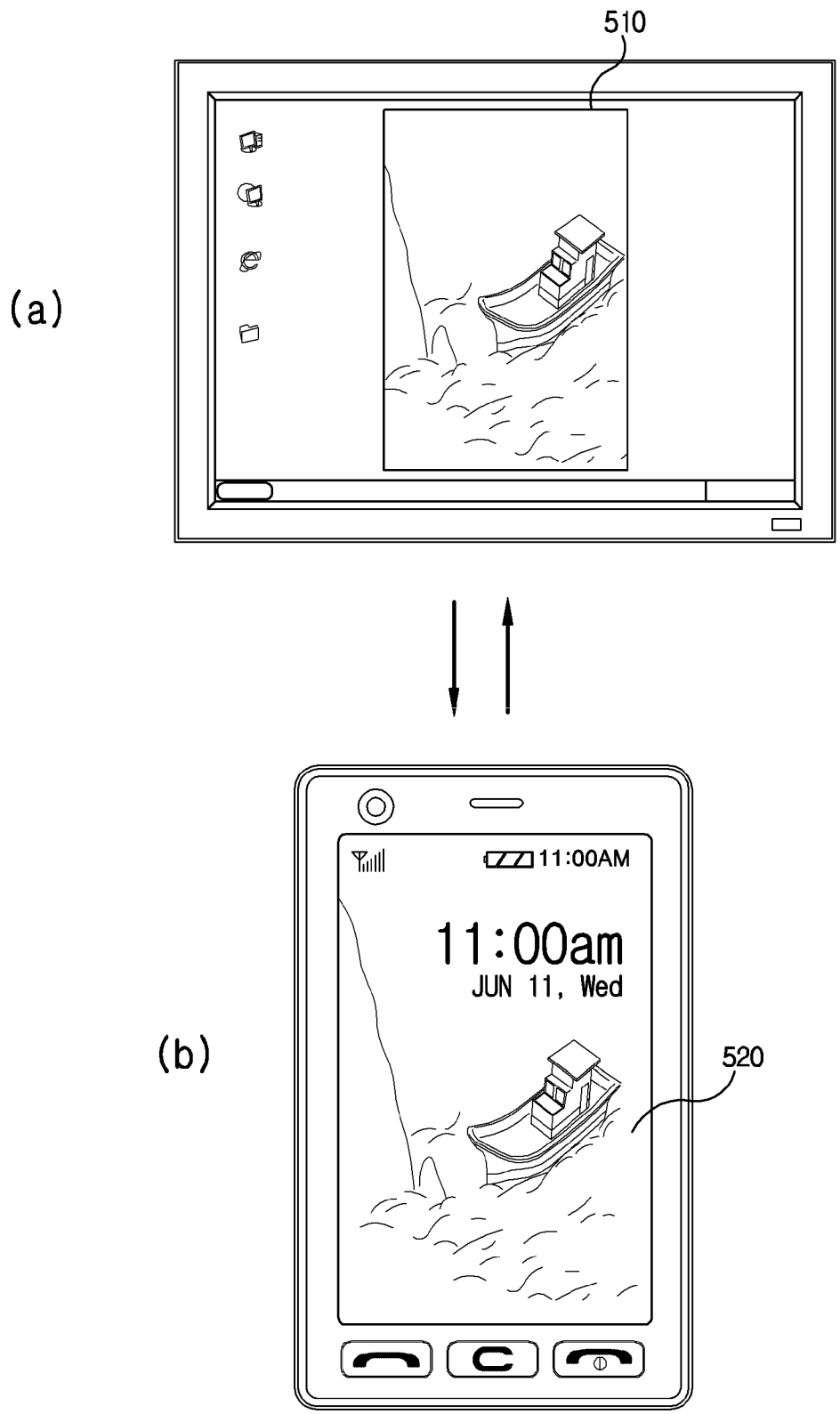
FIG. 10 is an image view of a mobile terminal applied with a sixth example of a method for controlling a mobile terminal according to the present disclosure.

FIG. 5 is an image view of mobile terminal applied with a first example of a method for controlling a mobile terminal according to the present disclosure, FIG. 6 is an image view of a mobile terminal applied with a second example of a method for controlling a mobile terminal according to the present disclosure, FIG. 7 is an image view of a mobile terminal applied with a third example of a method for controlling a mobile terminal according to the present disclosure, FIG. 8 is an image view of a mobile terminal applied with a fourth example of a method for controlling a mobile terminal according to the present disclosure, FIG. 9 is an image view of a mobile terminal applied with a fifth example of a method for controlling a mobile terminal according to the present disclosure, and FIG. 10 is an image view of a mobile terminal applied with a sixth example of a method for controlling a mobile terminal according to the present disclosure.

[First Exemplary Embodiment]

FIG. 5 is an image view of mobile terminal applied with a first example of a method for controlling a mobile terminal according to the present disclosure.

FIG. 5(a) illustrates a messenger screen of an external terminal (hereinafter referred to as PC). The messenger screen may include a user name block 201 and a user status block 203. As illustrated in FIG. 5(a), a current user status is 'on line' status. Under this circumstance, as illustrated in FIG. 5(b), the user selects a user status block 203 to change the user status to a 'position vacancy' 211.

Then, a messenger driving command signal is transmitted to a synchronized mobile terminal 100. The synchronization may be executed using short distance communication module such as Bluetooth, or using an Internet module such as WiFi.

The controller 180 of the mobile terminal 100 having received the messenger driving command signal and synchronized with the PC drives a messenger program stored in the memory 160 to allow the messenger screen to be displayed on the display 151 {see FIG. 5(c)}.

At this time, a messenger data may be displayed by receiving the messenger data from the synchronized PC along with the messenger screen. Alternatively, a conversation content data of the PC may be received from the external terminal and displayed. At this time, a pre-stored ID (Identification) and a password of the memory 160 of the mobile terminal may be employed to execute an automatic log-in function.

According to the first exemplary embodiment, in a case a position is moved while a messenger is used on the PC, a used messenger can be automatically used through the mobile terminal (handset) that is synchronized with the PC.

[Second Exemplary Embodiment]

FIG. 6 is an image view of a mobile terminal applied with a second example of a method for controlling a mobile terminal according to the present disclosure.

FIG. 6(a) illustrates a messenger screen of an external terminal (hereinafter referred to as PC). The messenger screen may include a user name block 201 and a user status block 203. As illustrated in FIG. 6(a), a current user status is 'on line' status. Under this circumstance, as illustrated in FIG. 6(b), the user selects a user status block 203 to change the user status to a 'position vacancy' 211.

Then, a receiving mode change signal is transmitted to the mobile terminal 100. The receiving mode change signal is a signal for changing a receiving mode of the mobile terminal to a manner mode. The synchronization may be executed using short distance communication module such as Bluetooth, or using an Internet module such as WiFi.

The controller 180 of the mobile terminal 100 having received the receiving mode change signal and synchronized with the PC may display on the display 151 a manner mode change check screen 230 {see FIG. 6(c)} for changing a receiving mode to a manner mode. The manner mode change check screen 230 may include a rejection icon 231. In a case there is no selection signal to the rejection icon 231 within a predetermined time, the receiving mode is automatically changed to the manner mode. In a case there is a selection signal to the rejection icon 231 within a predetermined time, the receiving mode of the mobile terminal 100 is kept.

Alternatively, the receiving mode can be automatically changed to the manner mode without display of the manner mode change screen.

Although the present exemplary embodiment has described a change to the manner mode, it is not limited thereto. For example, the receiving mode may be changed to an automatic response mode, a bell sound mode, a bell sound/vibration mode, or PC mode.

[Third Exemplary Embodiment]

FIG. 7 is an image view of a mobile terminal applied with a third example of a method for controlling a mobile terminal according to the present disclosure.

FIG. 7(a) illustrates a messenger screen 200 of an external terminal (hereinafter referred to as PC). The messenger screen 200 may include a user name block 201 and a user status block 203. As illustrated in FIG. 7(a), a current user status is 'on line' status. Under this circumstance, as illustrated in FIG. 7 (b), the user selects a user status block 203 to change the user status to a 'position vacancy' 211.

Successively, a receiving mode menu generation signal is transmitted to the synchronized mobile terminal 100. The receiving mode menu generation signal is a signal for displaying on the display 151 a menu for changing the receiving mode of the mobile terminal. The synchronization may be executed using short distance communication module such as Bluetooth, or using an Internet module such as WiFi.

The controller 180 of the mobile terminal 100 having received the receiving mode menu generation signal and synchronized with the PC may display on the display 151 a receiving mode menu screen 240 for changing the receiving mode {see FIG. 7(c)}. The receiving mode menu screen 240 may include a menu mode icon 241, an automatic response icon 242 and a PC mode icon 243.

In a case the manner mode icon 241 is selected, the controller 180 changes the receiving mode to the manner mode. In a case the automatic response icon 242 is selected, the controller 180 changes the receiving mode of the mobile terminal to the automatic response mode. As a result, in a case a call signal is received from another terminal, a pre-stored automatic response message is transmitted to said another terminal.

In a case the PC mode icon 243 is selected, the controller 180 the receiving mode of the mobile terminal to the PC mode. As a result, in a case a call signal is received from another terminal, a messenger driving signal is transmitted to said another terminal. The messenger driving signal may include an alarm message data and a messenger program driving signal.

In a case the messenger driving signal is received, the controller executes a messenger program of another terminal to communicate with a user of the mobile terminal 100 through messenger, along with a message that a messenger program is being used by a current user of the mobile terminal 100.

FIG. 7(d) illustrates a display of said another terminal having received the messenger driving signal. At this time, the display may be displayed with a mode change check screen 250 saying 'changed to PC mode'.

[Fourth Exemplary Embodiment]

FIG. 8 is an image view of a mobile terminal applied with a fourth example of a method for controlling a mobile terminal according to the present disclosure.

FIG. 8(a) illustrates a scheduler screen 300 of PC. As illustrated, the scheduler screen 300 may include a time block and a contents block. In a case a predetermined contents block is inputted with a memo 302, the memo contents, a time data corresponding to the memo and an alarm set-up signal are transmitted to the mobile terminal 100 synchronized with the PC.

Successively, through automatic or predetermined checking procedures, an alarm function of the mobile terminal 100 is set up using the memo contents and the time data. As a result, in a case a time is reached corresponding to the time data, the controller 180 may display a time 312 on the scheduler and memo contents 314 on the display 151 and activate the alarm 153 {see FIG. 8 (b)}.

According to the fourth exemplary embodiment, the schedule data on the PC can be easily moved to the mobile terminal.

[Fifth Exemplary Embodiment]

FIG. 9 is an image view of a mobile terminal applied with a fifth example of a method for controlling a mobile terminal according to the present disclosure.

FIG. 9(a) illustrates a screen 400 on which a moving picture is reproduced. As illustrated, in a case a multimedia file including the moving picture is reproduced by the PC, a receiving mode change signal is transmitted to the mobile terminal 100 synchronized with the PC.

Then, through automatic or predetermined checking procedures, the receiving mode of the mobile terminal 100 is changed to a predetermined mode (i.e., a manner mode or soundless mode). FIG. 9(b) illustrates a receiving mode check screen 410 notifying the receiving mode change.

[Sixth Exemplary Embodiment]

FIG. 10 is an image view of a mobile terminal applied with a sixth example of a method for controlling a mobile terminal according to the present disclosure.

FIG. 10(a) illustrates a background screen 510 of the PC. Under this circumstance, a background screen change signal is transmitted to the mobile terminal 100 synchronized with the PC. The transmission may be executed by a user command or automatically executed as the synchronization is implemented.

Then, through automatic or predetermined checking procedures, the background screen of the mobile terminal 100 is changed in the same manner as that of the PC. FIG. 10(b) illustrates a background screen 520 of the mobile terminal 100.

At this time, the controller 180 may re-size the size of a background screen data received from the PC in consideration of the size of the display 151 of the mobile terminal 100.

Furthermore, the messenger synchronization may be also executed. That is, the PC is equipped with an image data of a messenger conversant, and the synchronized mobile terminal can automatically receive the image data to set up as a corresponding conversant image.

The above-described methods can be implemented in a program recorded medium as computer-readable codes. The computer-readable media may include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The above-mentioned method for controlling a mobile terminal and a mobile terminal thereof may, however, be embodied in many different forms and should not be construed as limited to the embodiments set forth herein. While particular features or aspects may have been disclosed with respect to several implementations, such features or aspects may be selectively combined with one or more other features and/or aspects of other implementations as may be desired.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a mobile terminal, the method comprising:
    synchronizing the mobile terminal with an external terminal via a wireless communication module of the mobile terminal by executing a messenger program stored in a memory of the mobile terminal and displaying a screen corresponding to the executed messenger program on a display of the mobile terminal when a distance between the mobile terminal and the external terminal equals or exceeds a predetermined distance;
    receiving, via the wireless communication module, a control command signal based on a status of the external terminal and according to the synchronization of the mobile terminal with the external terminal;
    at least changing a receiving mode of the mobile terminal or setting up an alarm function of the mobile terminal based on the received control command signal; and
    displaying a receiving mode change menu when the control command signal is received,
    wherein the control command signal is received based on time and content information stored in a predetermined program.

2. The method of claim 1, wherein the synchronization of the mobile terminal with the external terminal comprises receiving a synchronization request signal from the external terminal when the messenger program is executed.

3. The method of claim 2, wherein the receiving of the control command signal is further based on messenger program status information that is received via the wireless communication module.

4. The method of claim 1, wherein the changing of the receiving mode comprises:
    determining the receiving mode that can be changed by a user selection signal while the receiving mode changing menu is displayed.

5. The method of claim 4, wherein the displayed receiving mode changing menu includes at least a menu mode, an automatic response mode, or a personal computer (PC) mode.

6. The method of claim 3, wherein the receiving of the control command signal based on the received messenger program status information comprises receiving the control command signal from the external terminal when a multimedia file is reproduced by the external terminal.

7. The method of claim 1, further comprising automatically logging into the executed messenger program via identification (ID) and password information stored in the memory.

8. A mobile terminal comprising:
    a display configured to display a screen corresponding to a messenger program;
    a memory configured to store the messenger program;
    a wireless communication module configured to:
        synchronize the mobile terminal with an external terminal, and
        receive a control command signal based on a status of the external terminal and according to the synchronization of the mobile terminal with the external terminal; and
    a controller configured to:
        control the wireless communication module to synchronize with the external terminal by executing the stored messenger program and control the display to display the screen corresponding to the executed messenger program when a distance between the mobile terminal and the external terminal equals or exceeds a predetermined distance,
at least change a receiving mode of the mobile terminal or set up an alarm function of the mobile terminal based on the received control command signal, and
control the display to display a receiving mode change menu when the control command signal is received,
wherein the control command signal is received based on time and content information stored in a predetermined program.

9. The mobile terminal of claim 8, wherein the controller is further configured to change the receiving mode based on messenger program status information that is received via the wireless communication module.

10. The mobile terminal of claim 8, wherein the displayed receiving mode change menu includes at least a menu mode, an automatic response mode, or a personal computer (PC) mode.

11. The mobile terminal of claim 8, wherein the controller is further configured to change the receiving mode when a reproduction control command based on a multimedia file reproduction by the external terminal is received.

12. The mobile terminal of claim 8, wherein the controller is further configured to determine that the distance between the mobile terminal and the external terminal equals or exceeds the predetermined distance based on a determination that an intensity of a signal received via the wireless communication module is less than a predetermined value.

13. The mobile terminal of claim 8, further comprising a position information module configured to obtain position information related to the mobile terminal, wherein the controller is further configured to determine that the distance between the mobile terminal and the external terminal equals or exceeds the predetermined distance based on the obtained position information.

14. The mobile terminal of claim 8, wherein:
the memory is further configured to store identification (ID) and password information; and
the controller is further configured to automatically log into the executed messenger program via the stored ID and password information when the distance between the mobile terminal and the external terminal equals or exceeds the predetermined distance.

* * * * *